US006807410B1

(12) United States Patent
Pailles et al.

(10) Patent No.: US 6,807,410 B1
(45) Date of Patent: Oct. 19, 2004

(54) ELECTRONIC PAYMENT PROCESS AND SYSTEM FOR IMPLEMENTING THIS PROCESS

(75) Inventors: Jean-Claude Pailles, Epron (FR); Philippe Levionnais, Caen (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/913,805

(22) PCT Filed: Feb. 18, 2000

(86) PCT No.: PCT/FR00/00412

§ 371 (c)(1),
(2), (4) Date: Aug. 17, 2001

(87) PCT Pub. No.: WO00/49585

PCT Pub. Date: Aug. 24, 2000

(30) Foreign Application Priority Data

Feb. 19, 1999 (FR) .............................. 99 02093

(51) Int. Cl.[7] .................. H04M 11/00; G06F 17/60
(52) U.S. Cl. ................... 455/407; 455/558; 455/466; 705/25; 705/39; 705/40
(58) Field of Search .................. 455/405, 406, 455/407, 408, 409, 558, 466; 705/25, 26, 40, 30, 35, 41, 42, 44

(56) References Cited

U.S. PATENT DOCUMENTS 5,909,485 A * 6/1999 Martin et al. ............. 379/114.2
6,675,007 B2 * 1/2004 Tamaki et al. ............... 455/406

OTHER PUBLICATIONS

WO 96/13814, *Real Time Tele–Payment System*, May 1996.
WO 96/25828, *A Method For Using Applications in a Mobile Station, a Mobile Station, and a System for Effecting Payments*, Aug. 1996.
WO 98/11519, *Cashless Payment by Means of a Mobile Radio Apparatus*, Mar. 1998.
WO 98/37524, *Transaction Method Using a Mobile Device*, Aug. 1998.
WO 98/42173, *Use of Banking Services in a Digital Cellular Radio System*, Oct. 1998.

* cited by examiner

Primary Examiner—Rexford Barnie
(74) Attorney, Agent, or Firm—Pearne & Gordon LLP

(57) ABSTRACT

Electronic payment process and system for implementing such a process.

Customer equipment is mobile equipment, for example of the GSM type. In addition to the customer (C) and the merchant (M), a gateway (P) participates in the transaction, authenticates the customer and the merchant and ensures that the goods item ordered will be duly paid for. Customer equipment may work with a bank payment card.

21 Claims, 1 Drawing Sheet

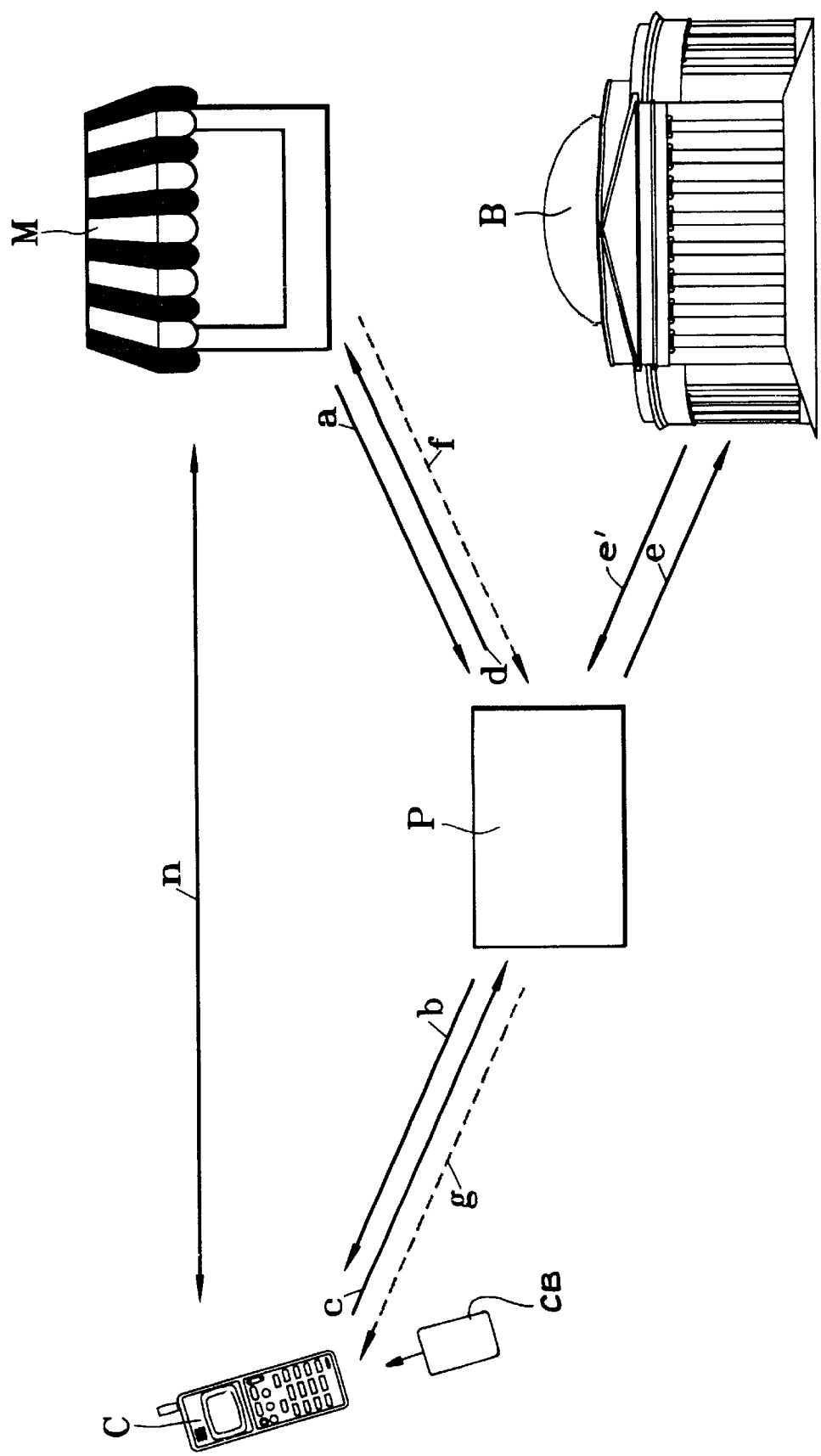

ELECTRONIC PAYMENT PROCESS AND SYSTEM FOR IMPLEMENTING THIS PROCESS

TECHNICAL FIELD

The object of the present invention is an electronic payment process and a system for implementing this process.

PRIOR ART

Electronic payment, or distance payment, is well known. It may take more or less sophisticated forms:

by telephone, a customer may communicate his bank card number to a merchant, with a personal computer, the customer may pass this number on to the merchant's server, with devices of the Minitel (trademark) type, which has a smart-card reader, the user inserts his bank card into the reader and provides a confidential code; if the code is correct, the card number is passed on to the merchant.

These procedures do not always offer the required security. In this respect, electronic payment raises specific difficulties. Thus, protecting the so-called bank card "identifiers" (card number/validity expiry date, etc.) also known as PAN ("Primary Account Number"), must be ensured effectively; spying on the network or the re-use of these numbers by a dishonest merchant are serious risks which need to be heeded in distance payment.

Furthermore, the impersonal nature of the customer-merchant relationship may be of concern to the customer who inevitably wonders whether the merchant is bona fide and if he is in fact going to deliver the goods item ordered. Merchant authentication is therefore necessary.

Conversely, the problem may conceivably arise of the customer refusing the goods: if the customer is not to have the means to deny making the purchase, a strong recognised electronic signature mechanism is needed which allows them to be statutorily bound by their decision to purchase. If such mechanisms are not in place, the honest merchant will be exposed to a real risk of non-payment.

All these difficulties are curbing the development of electronic commerce. The purpose of the present invention is to provide a solution to these difficulties.

The document WO-A-99/03243 describes a system and a process to manage transactions where a mediation server is placed between a server and a customer point. In this system, it is the customer who sends a request to the server, which responds through the mediation server which invoices the customer.

The document WO-A-96/25828 describes an electronic payment process in a mobile station.

DISCLOSURE OF THE INVENTION

To thus end, the invention proposes firstly the use, at customer level, of particular equipment namely mobile equipment, for example of the GSM ("Global System for Mobile Communications") type. It also proposes the participation of an entity ensuring the proper operation of the transaction. In respect of the first aspect of the invention, it is known that mobile equipment is developing rapidly in France and abroad: 10 million sets in France at the end of 1998, and 100 million in the world. We should remind ourselves of the functions of a mobile, in particular of the GSM type, in order to get a better understanding of the advantage of the electronic payment process according to the invention. GSM telephones have the conventional functions of a fixed telephone (dial to call, be called, voice communicate) and data send and receive functions:

1. sending DTMF ("Dual Tone Multi Frequency") data during voice communication, data which corresponds to the button code activated by the user;

2. send-receive short text messages (SM) which can be stored in a SIM ("Subscriber Identification Module") card; these messages may be displayed on a screen of the mobile equipment by means of particular buttons; these messages remain in the card until the user deletes them;

3. send-receive short data messages (SM), created and processed by a so-called "toolkit" program, or TK for short;

4. the programs referred to above are programs residing in the SIM card and which make it possible, in addition to the internal processes (calculation, data management) which any program can perform, to act on the mobile display, to enter the button on the keypad activated by the user, to receive an SM message, to send an SM message;

5. a new possibility has appeared in some mobile equipment; to accept a second smart-card, in addition to the SIM card, which makes it possible, for example, to use a portable GSM with a bank payment card (CB) nearly 30 million of which are in circulation in France, or an electronic purse card many of which exist in Europe or in the world.

It is notable that older (first generation, i.e. phase 1 and 2 GSM) mobile equipment only had functions 1 and 2. Functions 3 and 4 are of more recent origin and will be extended rapidly to all so-called second generation (phase 2+) mobiles; the no. 5 possibility for the moment concerns only a small percentage of second generation mobiles but is destined to develop.

According to the second aspect of the invention, electronic payment is made through a so-called "gateway" entity, acting as payment server. This gateway has telecommunications equipment allowing it to establish some form of connection (telephone, via the Internet network, etc.) with a merchant, and a telephone connection with the customer using the latter's GSM mobile equipment. The essential function of the gateway is to establish a link between the merchant and the customer by authenticating both the merchant and the customer, and to receive the customer's confidential data allowing him/her to make the payment.

The security of customer and merchant is thus ensured and the payment made.

More exactly, the object of the present invention is an electronic payment process involving a first entity called the "customer" having a first piece of telephone equipment and a second entity called "the merchant" having a second piece of telecommunications equipment, this process being characterised in that the customer's equipment is a piece of mobile telephone equipment and in that it involves additionally a third entity, called a "gateway" having a third piece of telecommunications equipment able to establish a connection with the merchant's equipment and a telephone connection with the customer's equipment, this process including the following exchanges between the equipment of the three entities:

a) the merchant sends to the gateway data defining an offer of service with, in particular, the amount to be settled by the customer, and adds to this data merchant identification data, b) the gateway authenticates the merchant, converts the offer data into a message adapted to the performance of the customer's mobile equipment and sends this message together with gateway authentication data to the customer, c) the customer authenticates the gateway and sends back to it an agreement message, together with confidential information allowing the payment amount to be settled, d) the gateway-authenticates the customer, verifies that payment is possible and sends to the merchant a message stipulating that the payment amount is fully able to be settled.

Preferably, the customer's mobile equipment is of the GSM type, of any generation (known or to come).

The third entity may, in certain circumstances, be located with the merchant, or in other circumstances, in the bank.

Another object of the present invention is a system for implementing this process.

BRIEF DESCRIPTION OF THE DRAWING

The single appended FIGURE shows the general architecture of the system of the invention and the different exchanges established between the different pieces of equipment.

DISCLOSURE OF PARTICULAR EMBODIMENTS

In the appended FIGURE, C denotes the customer's mobile equipment, M the merchant's equipment, P the gateway equipment, B one or more banks and CB a bank payment card or an electronic purse card. The arrows stand for exchanges between all these pieces of equipment. It will be pre-supposed, in the following description, that the customer's mobile equipment is GSM equipment and that the card is a bank card. In the interests of greater clarity, the gateway is dissociated from the equipment of the merchant and of the bank, but, in some circumstances, this gateway could be located with the merchant (or in the bank).

The electronic payment operation relating more specifically to the invention may be preceded by a negotiation between customer and merchant, a negotiation symbolised by the double arrow n in the FIGURE. The merchant may be a physical person equipped with a telephone or a voice server. In this case, the negotiation n consists of an exchange of voice messages sent by the server to the customer and of customer replies in the form of DTMF codes corresponding to the buttons activated on the keypad of the mobile equipment. Furthermore, the customer must give his mobile number to the merchant, unless this merchant has a telephone which displays the caller's number.

After this preliminary exchange the customer rings off and the negotiation phase is terminated. It may also be noted that the merchant may also be an Internet server. Exchanges then follow which allow the mutual commitment of customer and merchant in respect of the offer and the payment. The merchant sends a message a) to the gateway P for example by Minitel (trademark) or by a piece of equipment connected to the Internet network, communicates to the gateway P a contractual description of the service proposed and its price. For example, this message will contain: the mobile number, the date, the merchant ID, the goods item ID, the description of the goods item, the quantity, the price, etc. Additionally, the message a) contains security data allowing the gateway P to authenticate the merchant M.

A message b) is then sent to the customer C in a form dependent on the type of GSM mobile equipment and its capacities.

Via a message c), the customer C accepts or refuses the offer which is made to him. In the event of acceptance, the gateway P may ask the bank B for authorisation via an exchange e). The latter may send a response e' to the gateway. In the event of payment being accepted, the gateway P sends a message d) to the merchant M. If need be, the merchant M may send a confirmation f) to the gateway P, to indicate a delivery date, for example, or else some particular information such as an access code to a hotel where a room may have been reserved. This confirmation is sent to the customer via a message g). In another example, the customer obtains from a service provider (Television, Cinema, Internet) an access code which actually allows him to access a service: this code may for example be keyed in on the remote control of the television decoder in order to actually view the pre-bought programme, or again keyed in on the keypad of a ticket barrier giving access to the cinema or on the keyboard of the personal computer when connecting to this service. This confirmation is sent back in the form of a short message (SM) sent to the customer.

It is to be noted that, in the context of mobile telephony, some time may elapse between each of these different phases: indeed, after the preliminary negotiation, the propagation conditions related to the mobile being moved around or to the condition of its battery may well mean that message a) will be delayed by several minutes. The system must therefore be organised so as to take all these specific aspects of GSM technology into account.

To further describe the nature of the exchanges, four cases may be distinguished according to the nature of the customer's mobile equipment:

1. Case of First Generation Mobile Equipment

In this case, the mobiles do not have the processing capacity to send a short message SM with an electronic signature; furthermore, these mobiles have low display capabilities, which do not always allow a message describing an offer, which may include up to about a hundred characters, to be easily displayed. The process of the invention then includes the following exchanges, in addition to exchange a):

Exchange b)

The gateway P sends the customer a fixed message of the type: "call the gateway back on xxxxxxxx". Many current portables have an automatic re-dial of number received facility. Where this is this case, simply pressing the "call" button is enough for the number xxxxxxxx to be called. Otherwise, the customer will have to re-enter the number xxxxxxxx manually.

Exchange c)

this is made in voice mode between the gateway P, which may be an audio server and the portable. This makes it possible:

to authenticate the customer by asking him/her for a password previously agreed between the customer and the operator of the gateway P, to take cognisance of the offer (or offers if there are several, and to choose the one which is of interest.); to do this:

the gateway P will translate the offer received during the exchange a) into voice mode by means of an artificial speech system, the customer will be able to choose this offer and to ask for it to be paid by pressing on the OK button, for example, or to move on to the next offer (# button).

Exchange d)

the gateway P may simply confirm to the merchant that payment has been made.

Exchange e)

having authenticated the customer, and knowing furthermore his/her bank card number, the a gateway P may then ask for authorisation from the banks if it deems it necessary. It is presumed that, the customer gives his bank card number when subscribing to this service. Other payment processes could be used: direct debit authorisation for example given by the customer on subscription.

Exchange f)

the merchant may then send back particular information (examples given above) by means of message f).

Exchange g)

the gateway P sends message f) back to the customer, in the form of a short message SM. The gateway P may store these messages as evidence in any legal disputes that might subsequently arise between customer and merchant. This particular mode of implementation of the process constitutes a full response to the security concerns disclosed above. It is in fact based on the gateway knowing the customers and merchants:

protection of the bank card number: the variant described is based on the correspondence between an identifier (mobile telephone number) authenticating via the password the bank card number in the gateway P (which is a entity of confidence by definition). The bank card number may be registered in the gateway when the customer subscribes to the service;

the merchant must be authenticated with the gateway at exchange a);

customer commitment is ensured by the customer giving the gateway, an entity of confidence, his password; in the case of the variant described, the customer accesses the gateway by entering a telephone number but also a confidential code; the latter is to be also taken as the service access code issued on subscription.

2. Case of Second Generation Mobile Equipment

A distinction will be made between the case where the mobile equipment contains only one SIM card and the case where this equipment contains a second card of the bank card type.

2a. Case of Single SIM Card Mobile Equipment

In this case, the mobile equipment contains one SIM smart-card capable of registering a so-called SIM-TOOLKIT program capable of carrying out internal processing (calculation, management data), of acting on the mobile display, of entering the keypad buttons activated by the user, of receiving a short message, of sending such a message, etc.

In this case, the system may be open, and include several gateways, which do not know the data specific to the mobile equipment of customers. Each merchant must address himself to a particular gateway to which he is subscribed.

In this mode of implementation:

The bank card number (PAN) is stored in the SIM; it is conveyed in a secure (confidential) way to the gateway, in exchange c).

This exchange c) contains, moreover, an electronic signature which will constitute a proof of the commitment of the customer in this transaction. To this end, the customer must previously supply to the SIM card a confidential code (CC) without which the latter refuses to sign.

Authentication of the gateway is provided by an authentifier given by the message at exchange b), and verified by the SIM; the key allowing this authentifier to be verified is the same as that which acts to encrypt the PAN, and this therefore guarantees that only an authentic gateway is able to acquire a PAN.

In one advantageous mode of implementation, a public key system is used with a certification tree. This development in fact allows simple, secure and open systems to be designed. This technique is known. Only its mode of application to the present process will therefore be given.

By A is denoted a "root" authority of the certification tree which certifies the different payment servers. It certifies directly or indirectly through a certification chain at one or more levels the different customers, therefore in fact the secret and public keys (Si, Pi) which are in the SIM and which allow the electronic payment orders to be signed.

In exchange b), the message then contains the gateway ID, the date, the merchant ID, the goods item or service selected ID, the description of the goods item or service selected, the quantity, the price, through to the gateway public key, the certificate Cert(P) which is the gateway certificate assigned by the entity A hierarchically superior to the gateways. Cert(P) is in fact the signature by this authority A of the identity of the gateway and of its public key P:Cert(P)=SA (identities SP, P, etc.). The public key, PA corresponding to SA will be loaded in all the "TOOLKIT" SIM having this electronic payment application.

On receipt of the message, the SIM program will, by means of PA, verify the certificate Cert(P) and therefore obtain P in a secure way. It will display an "electronic payment" message on the display of the portable. The customer will be able to display the offer messages, present at that moment: he therefore gets on the display: the merchant ID, the description of the selected goods item, the quantity, the price.

To place an order, therefore to pay, the customer will enter a confidential code CC which the SIM will compare with the internal CC which it stores. If the code is correct, the SIM will send message c) containing:

the order (with the date, merchant ID, goods item or selected service ID, the quantity, the price, etc.), the card data encrypted by the public key i.e. P (PAN), the payment order signature Si (payment order), Pi, and the Pi certificates.

The message issued to the gateway in exchange c) reaches the gateway and the latter carries out the following processes:

Pi certificate verification, order (payment order) signature Si verification,

PAN decoding by calculation of S(p(PAN))=PAN to obtain the customer's bank card number.

Having authenticated the customer and knowing, furthermore, his/her bank card number, the gateway may then ask for authorisation from the banks if it deems it necessary (exchange e)).

The gateway may simply confirm to the merchant that payment has been made (d), The merchant may then send back a particular piece of information (examples given above) by means of message f)).

The gateway sends the message back to the customer, in the form of a short message SM. The gateway stores these messages as evidence in any legal disputes that might subsequently arise between customer and merchant.

This mode of implementation fully allows the objectives targeted in relation to security to be fulfilled:

protection of the bank card number: the variant described is based on the encryption of the PAN between the mobile and the gateway, the merchant must be authenticated with the gateway at exchange a). Furthermore, the gateway is authenticated indirectly by the mobile: more exactly, if a false gateway were to attempt to instigate this procedure, it would be obliged, in order to pass the key tests, to borrow the public key P and the Certificate Cert(P) of an authentic gateway, and therefore could not decode the PAN, since it would not know the secret key corresponding to the public key P, customer commitment stems from the fact that the customer gives the gateway an Si (payment order) signature which may have a legal value.

2b. Case of Dual Card Mobile Equipment

In this case, the mobile equipment contains one SIM card as previously, but one more card reader adapted to the bank card. It is then possible to establish a dialogue with this second card. The different exchanges may then be the following:

Exchange n)

This preliminary exchange may be carried out particularly:

by telephone contact between the customer and the merchant so as to negotiate the transaction, by navigation and data entry on the merchant's Internet site, at this first contact the goods item description, the price and the customer's name and address details are registered with the merchant.

Exchange a)

the merchant's offer is sent to the gateway to be registered and managed down to the final stage of the transaction. This offer defines the service and contains merchant ID data.

Exchange b)

the gateway authenticates the merchant and transmits the offer to the customer's equipment. It contains a transaction number, the goods item description, the price, etc. and the gateway ID data.

After these exchanges, the payment application placed in the SIM card manages the exchanges with the equipment user by asking him/her to make a decision. The customer then has the possibility of confirming his/her purchase or of not taking it further. If the customer accepts the offer which is being made to him/her, the SIM application invites him/her to insert his/her bank card into the second GSM equipment card reader then invites him/her to key in his/her confidential code. The sequence of operations is comparable to that of bank card payment with equipment such as is found in shops.

Exchange c)

the GSM mobile equipment sends the gateway P a message containing the bank payment data, or on the contrary the order cancellation.

Exchange e)

in the event of purchase confirmation, the gateway authenticates the customer and transmits the bank parameters to the bank B.

Exchange e')

the bank B examines the payment potential and informs the gateway P of this.

Exchange d)

the gateway sends the merchant the information relating to the likelihood of the payment.

Exchange f)

the merchant may then, if need be, add supplementary information (a hotel room code number, detail on routing the goods item, etc.). He may also cancel the transaction.

Exchange g)

the customer receives from the gateway the bank parameters of his purchase (equivalent of a credit card slip) and any supplementary information from the merchant.

3. Mobile Equipment with Bank Application in the SIM Card

To these three scenarios using either first generation (phase 1 or phase 2) mobiles, or second generation (phase 2+) mobiles, is added a fourth scenario: the mobile must be of the phase 2+ type but does not require an additional reader for the CB card. The TK application and the bank functions are in the SIM card. The operation of exchanges is the same as with a bank card, except that, in the customer terminal, the exchanges are no longer carried out through a bank card reader since the bank card functions are integrated in the SIM card.

What is claimed is:

1. An electronic payment process involving a first entity called "the customer" (C) having a first piece of telephone equipment and a second entity called "the merchant" (M) having a second piece of telecommunications equipment, characterised in that the customer's equipment is a piece of mobile telephone equipment and in that it involves additionally a third entity (P), called a "gateway", having a third piece of telecommunications equipment able to establish a connection with the merchant (M) equipment and a telephone connection with the customer (C) equipment, this process including the following exchanges between the equipment of the three entities:

a) the merchant sends to the gateway (P) data defining a service offer with, in particular, an amount to be settled by the customer, and adds to this data merchant identification data, b) the gateway (P) authenticates the merchant, converts the offer data into a message adapted to the performance of the customer's (C) mobile equipment and sends this message together with gateway (P) authentication data to the customer (C), c) the customer (C) authenticates the gateway (P) and sends back to it an agreement message, together with information allowing the bank to settle the payment amount, d) the gateway (P) authenticates the customer (C), verifies that payment is possible and sends the merchant (M) a message stipulating that the payment amount is fully able to be settled.

2. A process according to claim 1, wherein, after exchange d), the merchant (M) sends back to the gateway (P) a confirmation message and the gateway (P) sends back to the customer (C) a confirmation message.

3. A process according to claim 1 or 2, wherein having authenticated the customer (C) and the gateway (P) asks a bank (B) to verify if the payment amount may be settled and the bank (B) responds to the gateway (P).

4. A process according to any one of claims 1 to 3, wherein the customer's mobile equipment is GSM type equipment.

5. A process according to claim 4, wherein the customer's (C) mobile equipment includes a (SIM) ID card specific to the customer, which card contains a customer bank card number.

6. A process according to claim 5, wherein, at the start of exchange c), the (SIM) ID card receives from the customer a confidential code (CC), verifies if this code is correct, and, this being the case, the (SIM) ID card encrypts the customer bank card number by means of a key, and the customer equipment passes on this encrypted number to the gateway (P).

7. A process according to claim 1, wherein the customer authenticates the gateway (P) at the start of exchange c) by means of a key.

8. A process according to claims 6 and 7, wherein the key serving to encrypt the customer (C) bank card number and the key serving to authenticate the gateway (P) are the same.

9. A process according to claim 8, wherein the (SIM) ID card of the customer (C) and the gateway (P) each have a secret key and a public key.

10. A process according to claim 1, wherein the customer (C) signs the agreement message passed to the gateway (P) during exchange c) and the gateway (P) authenticates this signature.

11. A process according to claim 4, wherein the customer (C) mobile equipment includes a (SIM) ID card and a second card of the bank payment card (CB) type.

12. A process according to claim 11, wherein, after receiving from the gateway (P) the message containing the data relative to the merchant's offer, the (SIM) card invites the customer to insert his bank card (CB) into the equipment and to enter a confidential code.

13. A process according to claim 12, wherein the customer's (C) mobile equipment sends the gateway (P) data relating to the bank payment, the gateway (P) sends this data to a bank (B), which examines the payment potential and informs the gateway (P) of this in return.

14. A process according to claim 12, wherein, after exchange d) the merchant (M) sends back to the gateway (P) a confirmation message and the gateway (P) sends back to the customer (C) a confirmation message.

15. A process according to claim 4, wherein at exchanges b) and c), the gateway (P) sends the customer (C) a message asking him/her to call it back, the gateway (P) receives the call from the customer (C), authenticates the customer (C) and then sends him/her the message defining the service offer made by the merchant (M).

16. A process according to claim 15, wherein, at exchange c), the customer (C) communicates to the gateway (P) a password and wherein, before exchange d), the gateway (P) verifies said password.

17. A process according to claim 4, wherein the merchant (M) sends his offer message to one particular gateway (P) taken from several.

18. An electronic payment system for implementing the process according to claim 1, including a first piece of mobile telephone equipment used by a customer (C), a second piece of telecommunications equipment used by a merchant (M), a third piece of telecommunications equipment (P) used by a gateway able to establish a connection with the merchant (M) equipment and a telephone connection with the customer (C) equipment, the merchant (M) equipment including means able to send to the gateway (P) equipment data defining a service offer, with in particular the amount to be settled by the customer (C) together with merchant identification data, the gateway (P) equipment including authentication means able to authenticate the merchant (M) from the latter's ID data and means to convert the offer data into a message adapted to the customer (C) mobile equipment and to send this message to the customer with ID data, the customer (C) mobile equipment including means to authenticate the gateway (P) and to send it an agreement message together with confidential information allowing the amount for the service to be paid, the means for authenticating the gateway (P) equipment being able additionally to authenticate the customer (C), the gateway (P) equipment additionally including means to ensure that payment is possible.

19. A system according to claim 18, wherein the customer (C) mobile equipment is equipment of the GSM type.

20. A system according to claim 18, wherein the customer (C) mobile equipment is provided with means allowing a bank payment card (CB) to be inserted and used.

21. A system according to claim 18, wherein the customer (C) mobile equipment is provided with means allowing an electronic purse (PME) to be inserted and used.

* * * * *